United States Patent
Patel et al.

[15] 3,668,117
[45] June 6, 1972

[54] DESULFURIZATION OF A PREOXIDIZED OIL

[72] Inventors: Jitendra A. Patel, Beacon; Sheldon Herbstman, Spring Valley; Reese A. Peck; Raymond F. Wilson, both of Fishkill, all of N.Y.

[73] Assignee: Texaco Inc., New York, N.Y.

[22] Filed: Mar. 17, 1970

[21] Appl. No.: 20,286

[52] U.S. Cl. .......................................................... 208/228
[51] Int. Cl. ......................................................... C10g 19/00
[58] Field of Search ............. 208/208 R, 231, 240, 249, 189, 208/193, 201, 203, 204, 222, 229, 228

[56] References Cited

UNITED STATES PATENTS

| | | |
|---|---|---|
| 2,908,637 | 10/1959 | Lukk et al. .............................. 208/203 |
| 3,505,210 | 4/1970 | Wallace et al. .......................... 208/228 |
| 3,595,778 | 7/1971 | Smetana et al. ......................... 208/228 |
| 3,565,793 | 2/1971 | Herbstman et al. ................. 208/208 R |

FOREIGN PATENTS OR APPLICATIONS 661,165  7/1965  Belgium ................................. 208/229

Primary Examiner—Delbert E. Gantz
Assistant Examiner—G. J. Crasanakis
Attorney—Thomas H. Whaley and Carl G. Ries

[57] ABSTRACT

A sulfur-containing oil is initially preoxidized with an oxidant, such as, an organic peroxide, an organic hydroperoxide, air or an organic peracid in the presence of a Group IV—B, Group V—B or VI—B metal catalyst, water is then added to the preoxidized oil and desulfurization is carried out with sodium oxide, potassium oxide or calcium oxide catalyst on an alumina support. Water is added to the oil prior to desulfurization at a concentration ranging from 1 to 20 percent by weight.

3 Claims, 2 Drawing Figures

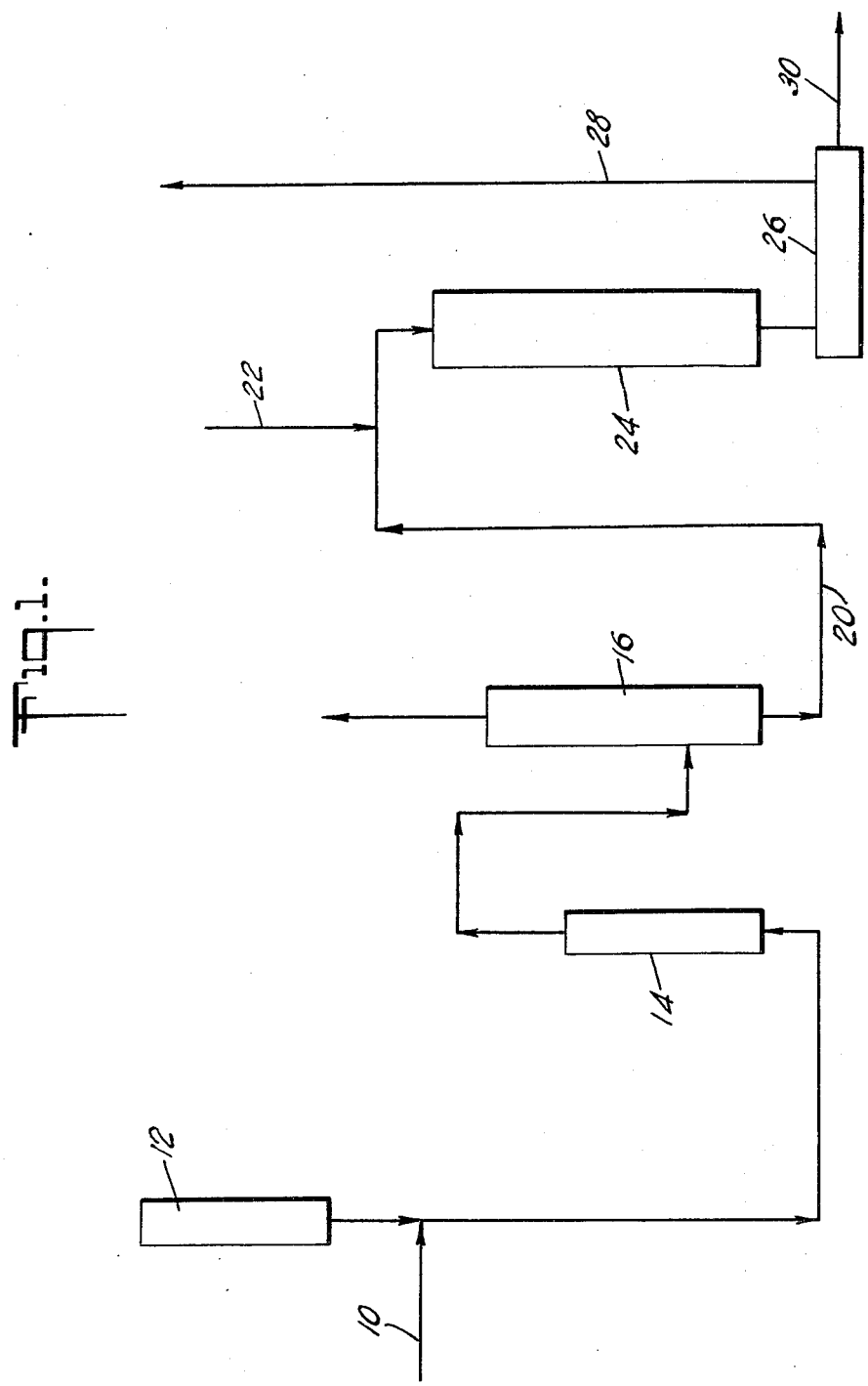

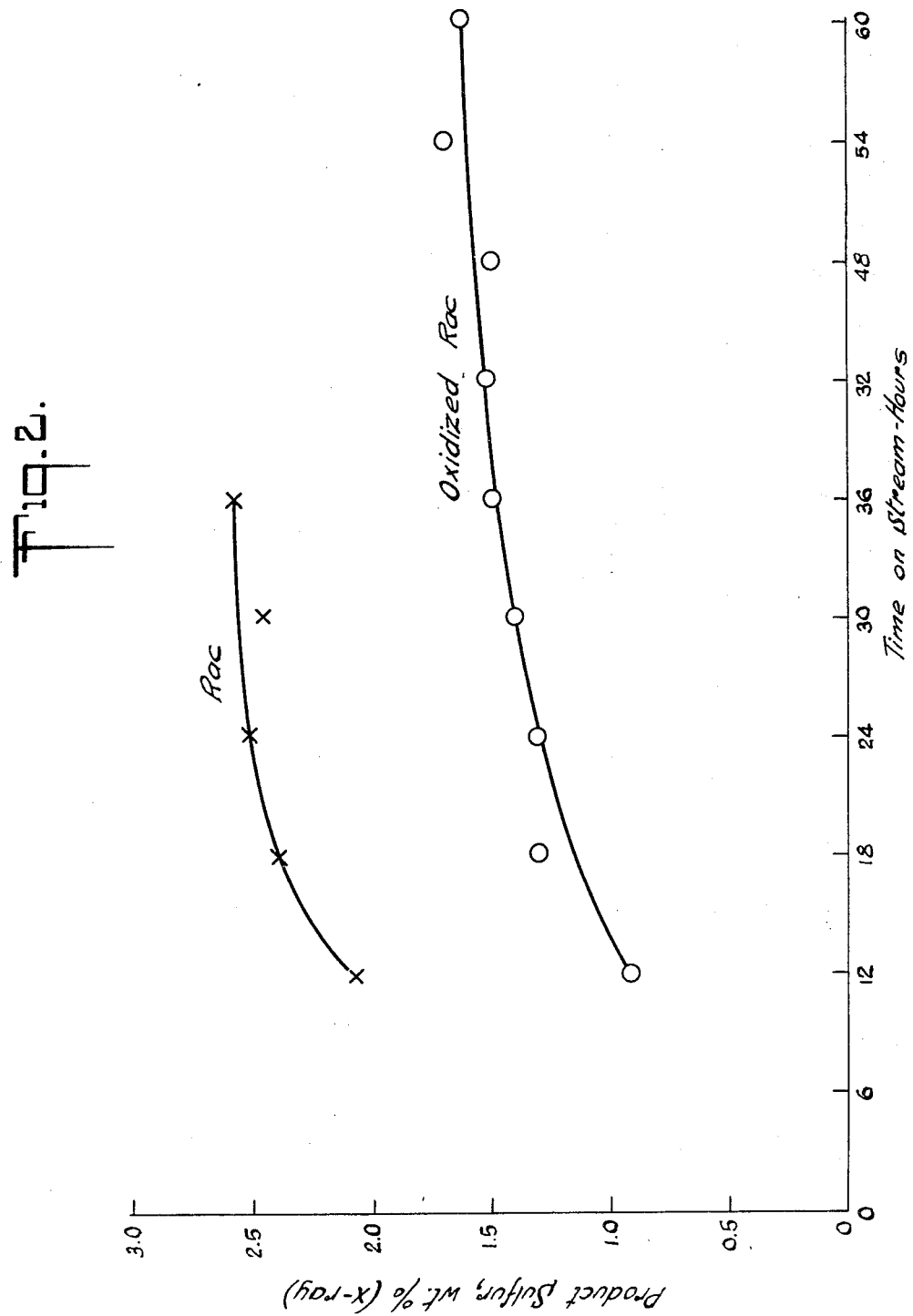

DESULFURIZATION OF A PREOXIDIZED OIL

BACKGROUND OF THE INVENTION

This invention relates to the continuous desulfurization of a hydrocarbon material and more particularly to the desulfurization of hydrocarbon materials of petroleum origin and in particular petroleum fractions of higher molecular weight by treatment with water at high temperatures over a catalyst.

In the past, numerous processes have been employed either to eliminate undesirable sulfur compounds or to convert them into more innocuous forms. One type of process involves physical extraction with a liquid such as sulfuric acid, sulfur dioxide or furfural. Another type of process removes the sulfur compounds by adsorption on suitable materials, for example activated bauxite, activated charcoal or an activated clay. A further type of process converts objectionable forms of sulfur compounds, such as mercaptans, into less harmful forms, such as disulfides and polysulfides by various chemical treatments, for example plumbite treatments, hydrochlorite treatments and copper chloride treatments. The above processes are particularly used for the treatment of gasoline fractions. With feedstocks of high molecular weight, a large proportion of the material is in the form of molecules containing at least one sulfur atom, including thiophene sulfur, and such molecules particularly, in selective separation processes, would be removed only to a limited extent and with consequent low product yield.

In addition to the above methods for the desulfurization of a hydrocarbon material, desulfurization of hydrocarbon material has been attempted utilizing oxidation with oxygen as an oxidant followed by thermal treatment to remove sulfur from the oxidized material. The problem that arises utilizing the prior art methods is that heavy hydrocarbon materials such as vacuum residues contain sulfur in the form of thiophene sulfur which type of sulfur is particularly difficult to remove from such hydrocarbon material. In addition, the air oxidation of a sulfur containing hydrocarbon material is not selective towards sulfur oxidation of the hydrocarbon materials, and the formation of ketones and acids occurs. A particular problem that can occur utilizing an oxidation step is the necessity of obtaining a catalyst which will promote the effectiveness of an oxidant while not substantially affecting adversely the overall product quality of the hydrocarbon material. Thus, certain catalysts promote non-selective oxidation or give relatively little increase in oxidation rates when combined with an oxidant.

Additional disadvantages of the prior art methods are the high product losses which can occur using for example an air oxidation process, the length of time that is needed in order to effect even minimum sulfur removal; and rapid catalyst deactivation. As is apparent from the foregoing, there exists the problem in a desulfurization process of obtaining low product losses, and high percent sulfur reduction.

It is therefore an object of this invention to increase the desulfurization of a hydrocarbon material at low product losses and without rapid catalyst deactivation. This and other related objects, features and advantages of the present invention will be more readily understood as the description thereof proceeds, particularly when taken together with the accompanying drawing wherein:

FIG. 1 is a flowsheet for a preferred embodiment of the invention and

FIG. 2 is a graph showing continuous water desulfurization of oxidized residual oil without rapid catalyst deactivation.

It has now been found that desulfurization of a hydrocarbon material can be accomplished by contacting a sulfur containing hydrocarbon material with an oxidant selected from the group consisting of an organic hydroperoxide, air, an organic peroxide, and organic peracid and mixtures thereof in the presence of a metal catalyst selected from the group consisting of a Group IVB metal, a Group VB metal, a Group VIB metal, and mixtures thereof and reducing the sulfur content of the hydrocarbon material utilizing a sulfur reducing process step. Thus it has been found that the use of a Group IVB, a Group VB and a Group VIB metal catalyst or mixtures thereof (hereinafter referred to as catalyst) in conjunction with an organic peroxide, air, an organic hydroperoxide, an organic peracid or mixtures thereof (hereinafter referred to as oxidant) provides selectivity in oxidation of sulfur, that is, undesirable oxidation products are not formed to any substantial degree. In addition, high percent yields of hydrocarbon material (e.g. low product losses) are obtained after removal of sulfur using a sulfur reduction process step. By the use of the term "mixtures thereof," when referring to both the catalyst and oxidant, refers to the use of one or more metals or oxidants within the particular group as well as to combinations of different metals and different oxidants within two or more groups. Thus, "mixtures thereof" refers to the use of two different metals within, for example, Group IVB as well as to the use of such metal with a Group VB metal and to the use of two different organic peroxides as well as the use of an organic peroxide with an organic hydroperoxide.

In general the process of this invention is practiced by contacting the sulfur containing hydrocarbon material with an oxidant (e.g. an oxidizing amount) in the presence of an oil soluble metal catalyst for a time sufficient to effect oxidation of at least a portion of the sulfur present in the hydrocarbon material, generally from about ½ hour to about 24 hours. The catalyst is used at a concentration which is sufficient to promote the effectiveness of the oxidant for the selective oxidation of sulfur compounds. In general, however, it is preferred to use a catalyst concentration varying from about 0.001 to about 10 wt. percent based upon the weight of the sulfur containing hydrocarbon oil and still more preferably from about 0.10 wt. percent to about 10 wt. percent. It is preferred to use the catalyst in the form of a 10 to 30 percent blend in mineral oil. The concentration of oxidant is usually dependent upon the weight percent sulfur present in the hydrocarbon material and in general the mole ratio of oxidant to sulfur is from about 0.2 to about 10 moles of oxidant per mole of sulfur, more preferably from about 1 to about 8 moles of oxidant per mole of sulfur and still more preferably from about 1.5 to about 5 moles of oxidant per mole of sulfur. The temperature utilized in carrying out the oxidation step can vary over a wide range and in general is from about 28° F. to about 450° F., preferably from about 50° F. to about 300° F. The process of this invention in general is carried out at atmospheric pressure although pressures up to about 100 atmospheres or higher can be utilized.

The oxidation step as set forth above can optionally include a stripping of the hydrocarbon material with a gas such as carbon dioxide, or nitrogen. This stripping step can accompany the oxidation step or can follow the oxidation step prior to the sulfur reducing step.

Many types of apparatus are suitable for carrying out the reaction including rocking autoclave, mechanically stirred tanks, etc. The reactions can be carried out batchwise, semicontinuously or continuously.

In carrying out the process of this invention, from 1 to 20 per cent by weight of water is added to the oxidized oil prior to the catalytic desulfurization step. The catalytic desulfurization step can be carried out in the presence of suitable desulfurizing catalysts comprising porous solids having acidic or basic properties, for example, ferric oxide on alumina, bauxite, thoria on pumice, silica alumina, soda-lime and acid sodium phosphate on carbon. The preferred catalytic desulfurization catalysts are sodium oxide, potassium oxide or calcium oxide on alumina. A particularly preferred catalyst is one consisting of sodium oxide on alumina $Na_2O$—$Al_2O_3$ in which the $Na_2O$ content ranges from 1 to 20 per cent.

Thus the present process is a novel combination of a preoxidation treatment, a water treatment and a catalytic desulfurization. It is especially advantageous in treating those petroleum fractions containing at least a major amount of material boiling above 500° F., for example, crude oil and atmospheric and vacuum residues which contain usually 1 percent by weight or more of sulfur. Additional examples of hydrocarbon oils to which the present invention may be usefully applied are cracked gas oils, residual fuel oils, crude petroleum from which the lighter fractions are absent, residues from cracking processes, oils from tar sands and oil shale. The invention is especially applicable to such of these and other like materials as cannot be deeply flashed without extensive carry over of sulfur containing compounds.

The oxidants which are utilized in carrying out the process of this invention are selected from organic peroxides, air, organic hydroperoxides and organic peracids. These oxidants include by way of example hydrocarbon peroxides, hydrocarbon hydroperoxides and hydrocarbon peracids wherein the hydrocarbon radicals in general contain from one to about 30 carbon atoms per peroxide linkage. With respect to the hydrocarbon peroxides and hydrocarbon hydroperoxides, it is particularly preferred that such hydrocarbon radicals contain from four to 18 carbon atoms per peroxide linkage and more particularly from four to 16 carbon atoms per peroxide linkage. With respect to the hydrocarbon peracids, the hydrocarbon radical is defined as that radical which is attached to the carbonyl carbon and in general such hydrocarbon radical can be from one to about eight carbon atoms. It is intended that the term organic peracid includes by way of definition performic acid wherein hydrogen is attached to the carbonyl carbon. A particularly preferred embodiment of this invention is the use of organic hydroperoxides and organic peroxides in combination with the metal containing catalyst. Thus it has been found that the organic hydroperoxides and peroxides are promoted selectively in combination with these metal catalysts. The particularly preferred oxidants are the organic hydroperoxides preferably tertiary butyl hydroperoxide and cumene hydroperoxide.

In addition it is contemplated within the scope of this invention that the organic oxidants can be prepared in situ, that is, the peroxide, hydroperoxide or peracid can be generated in the sulfur containing heavy hydrocarbon fraction and such organic oxidant is contemplated for use within the scope of this invention.

Typical examples of oxidants are hydroxyheptyl peroxide, cyclohexanone peroxide, t-butyl peracetate, di-t-butyl diperphthalate, t-butyl-perbenzoate, methyl ethyl ketone peroxide, dicumyl peroxide, t-butyl hydroperoxide, di-t-butyl peroxide, p-menthane hydroperoxide, pinane hydroperoxide, 2,5-dimethylhexane-2,5-di-hydroperoxide and cumene hydroperoxide, organic peracids, such as performic acid, peracetic acid, trichloroperacetic acid, perbenzoic acid and perphthalic acid.

The catalysts which are utilized to promote the oxidation of sulfur using the preferred oxidants are catalysts selected from Group IVB, Group VB and Group VIB metals. These catalysts can be incorporated into the oxidation system by any means known to those skilled in the art, and can be either a homogeneous or heterogeneous catalyst system. The catalyst can be incorporated by a variety of means and by the use of a variety of carriers. The particular catalyst carrier which is utilized is not critical with respect to the practice of this invention and can be for example, a support medium or an anion (including complex formation) which is attached to the metal (e.g. a ligand). The particularly preferred catalyst metals are titanium, zirconium, vanadium, tantalum, chromium, molybdenum and tungsten. Illustrative ligands include halides, organic acids, alcoholates, mercaptides, sulfonates and phenolates. These metals may be also bound by a variety of complexing agents including acetyl acetonates, amines, ammonia, carbon monoxide and olefins, amongst others. The metals may also be introduced in the form of organometallics including "ferrocene" type structures. The various ligands illustrated above which are utilized solely as carriers to incorporate the metal into the process system, in general have an organic radical attached to a functional group such as the oxygen atom of the carbonyloxy group of the acid, the oxygen of the alcohol, the sulfur of the mercaptan, the

of the sulfonate, the oxygen of the phenolic compound and the nitrogen of the amines. The organic radical attached to the aforedescribed functional groups can be defined as a hydrocarbon radical and in general can contain from one to about 30 carbon atoms. Typical examples of hydrocarbon radicals are set forth above.

The metals contained in the heterogeneous catalyst can include individual or combinations of metals. These metals can be suspended on a suitable material, for example alumina, silica (or combination of both) as well as activated clays or carbon, amongst others. The modes of contacting whereby the catalytic effect may be achieved may include slurry-bed reactions or continuous contacting over a stationary phase in a tubular reactor. The particular preferred catalyst for carrying out the oxidation step of the process of this invention is molybdenum such as in the form of molybdenum hexacarbonyl.

The present combination process may be carried out as shown in the flowsheet of FIG. 1. Thus a charge of hydrocarbon oil is pumped in through line 10 and mixed with an oxidant such as t-butyl hydroperoxide dispensed from a source thereof 12. The charge and oxidant then enter reactor 14. After oxidation, the mixture enters stripper 16 where by-products such as t-butyl alcohol are removed through line 18. The oxidized oil passes out through line 20 and then is mixed in-line with water supplied through line 22 and enters a desulfurization chamber 24 containing one of the previously mentioned catalysts where desulfurization takes place at a temperature of between 500° and 800° F. Following the desulfurization step, the oil passes into separator 26 where gases such as $H_2S$, $H_2$ and $CO_2$ are separated through line 28 while desulfurized oil flows out of line 30.

The mechanism of the desulfurization is not clearly understood. It is believed that at 700° F. sodium oxide in the $Na_2O-Al_2O_3$ catalyst reacts with and desulfurizes organo sulfur compounds in the residual oil; the catalyst may be converted to sodium aluminum oxysulfide as shown below:

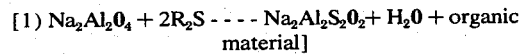

The desulfurization of residual oil by sodium oxide or hydroxide at about 700° F. has been previously reported.

Besides desulfurization the oil can also undergo steam reforming under the above conditions since hydrogen, carbon dioxide and methane appear in the reaction gases. It is believed that the sodium aluminate catalyst is continuously regenerated by reaction with hydrogen, carbon dioxide and water as shown below:

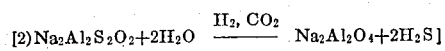

The net result of equations (1), (2) is a catalytic cycle in which the residual oil is desulfurized and the sulfur converted to hydrogen sulfide.

Table I, below, gives inspection tests on the charge oils, 550° F.+ Reduced Arabian Crude and the oxidized 550° F.+ Reduced Arabian Crude. The residual oil oxidation was achieved using 2 moles tert-butyl hydroperoxide at 210° F., 0.25 LHSV with a $MoO_3-Al_2O_3$ catalyst as well as 500 ppm molybdenum as molybdenum 2-ethylhexyldithiophosphate in the feed. The catalyst used in the catalytic desulfurization step is composed of gamma alumina $Na_2O-Al_2O_3$ extrudates (1/16 inch) on which 15 per cent sodium hydroxide was initially deposited and converted to the oxide by drying and calcining at 600° F.

Table II gives data on the desulfurization of 550° F.+ Reduced Arabian Crude. It is noteworthy that only 4.1 per cent desulfurization is achieved by treating the residual oil at 700° F., 0.10 LHSV, 0 psig using the $Na_2O-Al_2O_3$ catalyst in the absence of water (run PRS 26462-2); when water is present, however, 13.3 per cent desulfurization is achieved and considerable hydrogen and hydrogen sulfide is evolved in the off-gas of the reaction (run PRS 26136-31). This indicates the outstanding effectiveness of water in the feed. When the preoxidized feed is treated under the same conditions, desul-

TABLE I
Inspection tests on charge stock and oxidized feed

| Stock No | BRL 66-5394 | PPRS 26136-6 |
|---|---|---|
| Stock name | 550°F.+ atmospheric reduced Arabian crude | Oxidized 550°F.+ atmospheric reduced Arabian crude [2]—free of t-butyl alcohol and kerosine [3] |
| Gravity, °API | 21.0 | 19.3 |
| Carbon residue, wt. percent | 5.71 | 8.46 |
| Carbon, wt. percent | 84.70 | |
| Hydrogen, wt. percent | 11.70 | |
| Nitrogen, wt. percent | 0.13 | 0.13 |
| Sulfur, wt. percent (X-ray) | 2.60 | 2.60 |
| Ash, wt. percent | 0.01 | |
| Active oxygen, wt. percent | | 0.030 |
| t-Butyl alcohol, wt. percent (GC) | | |
| Oxidation selectivity [1] | | 1.388 |
| Metals, p.p.m.: | | |
| Fe | 25 | |
| Ni | 16 | |
| V | 14 | |
| DPI distillation, wt. percent: | | |
| LE-IBP | 0.50 | |
| IBP-650° F | 19.40 | |
| 650-850° F | 31.50 | |
| 850° F.+ | 48.60 | |

[1] Oxidation Selectivity—I.R. Absorbance at 1,300 cm.$^{-1}$×10 / Wt. percent Sulfur in Untreated Reduced Crude

[2] Obtained by atmospheric distillation of Arabian whole crude, BRL 68-158.

[3] t.Butyl hydroperoxide oxidized (2 moles oxidant/mole sulfur) CP-2-N-68-393C.

TABLE II
Desulfurization of oxidized and untreated atmospheric reduced Arabian crude (RAC) over Na$_2$OAl$_2$O$_3$ catalyst or by pyrolysis

| Run No. PPRS | 26462-2 | 26136-31 | 26136-23 | 26136-7.1 |
|---|---|---|---|---|
| Feed | 550°F.+ RAC | 550°F.+ RAC containing 500 p.p.m. molybdenum and 5 wt. percent emulsified water (2.8% S of blend) | Oxidized 550°F.+ RAC containing 500 p.p.m. molybdenum and 5 wt. percent emulsified water (2.44% S of blend) | Oxidized 550°F.+ RAC containing 500 p.p.m. molybdenum |
| Catalyst | Na$_2$O-Al$_2$O$_3$ | Na$_2$O-Al$_2$O$_3$ | Na$_2$O-Al$_2$O$_3$ | Berl Saddles |
| Mode | | Downflow | | |
| Temperature, °F | | 700 | | 750 |
| Pressure, p.s.i.g | | 0.0 | | |
| LHSV, v./hr./v | | a 0.10 | | |
| Product analysis: | | | | |
| Gravity, °API at 60° F | 21.6 | 23.2 | 20.8 | 20.9 |
| Sulfur, wt. percent (X-ray) | 2.5 | 2.4 | 1.48 | 1.95 |
| Carbon residue, wt. percent | 6.59 | 5.35 | 10.30 | 9.05 |
| Nitrogen, wt. percent | 0.12 | 0.09 | | 0.12 |
| Asphaltene, wt. percent | 2.05 | 3.02 | 7.96 | |
| Water, content, wt. percent | | | 7.0 | 0 |
| DPI distillation, wt. percent: | | | | |
| LE-IBP | 0.0 | 0.0 | 5.25 | |
| IBP-400° F | 6.84 | 0.856 | 1.47 | |
| 400-500° F | 4.98 | 6.63 | 2.10 | |
| 550-650° F | 9.46 | 15.41 | 13.38 | |
| 650° F+ | 78.90 | 77.08 | 77.78 | |
| Gas make, SCFB: | | | | |
| H$_2$ | 10-34 | 72-90 | 38-75 | |
| CH$_4$ | 3-6 | 8-11 | 10-15 | |
| CO$_2$ | 0.05-0.20 | 1-5 | 5-9 | |
| H$_2$S | 0.0-0.17 | 2-5 | 30-50 | |
| Desulfurization, wt. percent | 4.1 | 13.35 | 41.75 | 26.5 | a 4.0 hrs. residence time.

furization is increased to 41.75 per cent and considerable hydrogen and hydrogen sulfide along with carbon dioxide and methane are formed (run PRS 26136-23). By contrast, thermal desulfurization of the oxidized residual oil (without water) over Berl saddles at 750° F., 0.10 LHSV resulted in only 26.5 per cent desulfurization along with considerable coking (run 26136-7.1). The later runs indicate that a truly synergistic effect is achieved by the water desulfurization of the oxidized residual oil over sodium aluminate catalyst. FIG. 2 shows that the water desulfurization of the oxidized residual oil was continuous over a 60 hour period without rapid catalyst deactivation.

What is claimed is:

1. In a desulfurization process wherein a sulfur-containing oil is preoxidized with an oxidant and sulfur is then removed with a desulfurization catalyst, the improvement which comprises adding from 1 to 20 percent by weight of water to the preoxidized oil, and removing sulfur from the water-containing preoxidized material by passing said material over said desulfurization catalyst selected from the group consisting of sodium oxide, potassium oxide or calcium oxide, said catalyst being supported on alumina at a space velocity between 0.1 to 10 and at a temperature ranging from about 500° to 800° F.

2. Process according to claim 1, wherein said oil is residual oil.

3. Process according to claim 1, wherein the oxidant is t-butyl hydroperoxide and said desulfurization catalyst is sodium oxide on alumina.

* * * * *